United States Patent [19]

Blankemeyer

[11] Patent Number: 4,762,114
[45] Date of Patent: Aug. 9, 1988

[54] PORTABLE COOKING APPARATUS WITH A REMOVABLE WORK TABLE

[76] Inventor: William J. Blankemeyer, 813 E. 5th St., Ottawa, Ohio 45875

[21] Appl. No.: 100,417

[22] Filed: Sep. 24, 1987

[51] Int. Cl.⁴ ............................................. F24C 1/16
[52] U.S. Cl. ................................. 126/373; 126/25 R
[58] Field of Search ................... 126/373, 376, 25 R, 126/9 R, 9 B, 26, 37 B, 25 A, 25 AA, 377

[56] References Cited

U.S. PATENT DOCUMENTS

| | | | |
|---|---|---|---|
| 2,473,658 | 6/1949 | Milligan | 126/9 B |
| 2,511,594 | 6/1950 | Loftreds | 126/9 B |
| 2,512,223 | 6/1950 | Contiguglia | 126/9 R |
| 2,608,190 | 8/1952 | Winning et al. | 126/9 R |
| 2,985,164 | 5/1961 | Imoto | 126/9 R |
| 3,200,806 | 8/1965 | Goldstein | 126/9 R |
| 3,812,836 | 5/1974 | Jackson | 126/9 R |
| 4,064,812 | 12/1977 | Commanda | 126/37 B |
| 4,210,118 | 7/1980 | Davis et al. | 126/9 B |
| 4,337,751 | 7/1982 | Sampson et al. | 126/9 B |
| 4,646,711 | 3/1987 | Oliphant | 126/9 R |
| 4,688,541 | 8/1987 | Stephen et al. | 126/9 B |
| 4,688,549 | 8/1987 | Blankemeyer et al. | 126/373 |

Primary Examiner—Carroll B. Dority, Jr.
Attorney, Agent, or Firm—MacMillan, Sobanski & Todd

[57] ABSTRACT

An improved portable cooking apparatus having a removable work table. The apparatus includes a housing having at least three brackets attached to its outer surface. Removable legs telescope into bottom openings in the brackets for supporting the housing and removable support brackets for the work table telescope into upper openings through the brackets and the legs.

3 Claims, 2 Drawing Sheets

PORTABLE COOKING APPARATUS WITH A REMOVABLE WORK TABLE

TECHNICAL FIELD

The present invention relates to cooking apparatus and more particularly to an improved portable cooking apparatus having a removable table.

BACKGROUND ART

Numerous portable cooking stoves and grills are known in the art for use, for example, by campers or the military, when permanent stoves are not available. A portable grill may comprise, for example, a dish shaped housing supported on three legs. Charcoal is placed in the housing and ignited for cooking food placed on a grate attached to the top of the housing. One type of portable stove shown in U.S. Pat. No. 4,688,549 to Blankemeyer et al. includes a housing in which a gas-fired burner is located. The housing is supported on three legs which have upper ends extending above the housing for supporting a cooking vessel. When using portable cooking apparatus, an attached work table would be handy since there is usually a shortage of work space, for example, when camping. With either type of prior art portable cooking apparatus, there is no convenient way to removably attach a work table to the apparatus. A work table should be removable to facilitate storage in a compact space when the apparatus is moved.

DISCLOSURE OF INVENTION

According to the invention, portable cooking apparatus is provided with a removable work table. The cooking apparatus may comprise, for example, a portable gas-fired cooking apparatus or a portable charcoal grill. The cooking apparatus includes a housing which supports a cooking vessel such as a pan or a grate. A source of heat such as a gas-fired burner or a charcoal fire is located in the housing. On an exterior surface of the housing, at least three tubular brackets, and preferably four tubular brackets are attached. The brackets are oriented with central openings extending in a generally vertical direction. Upper ends of legs telescope into the bottoms of at least three of the openings for supporting the housing. The upper leg ends are provided with central openings. A work table is attached to at least two support brackets which have ends which telescope into the central openings in two upper leg ends. Preferably, a third support bracket attached to the work table between the other two support brackets telescopes into a fourth tubular bracket attached to the housing between the other tubular brackets which support the work table. The cooking apparatus can be made compact for storage by lifting the work table from the housing and removing the legs from the housing. In a preferred embodiment, the support brackets may be detached from the work table during storage.

Accordingly, it is an object of the invention to provide an improved portable cooking apparatus including a removable work table.

Other objects and advantages of the invention will become apparent from the following detailed description and the drawings.

BEST MODES FOR CARRYING OUT THE INVENTION

Figure 1:
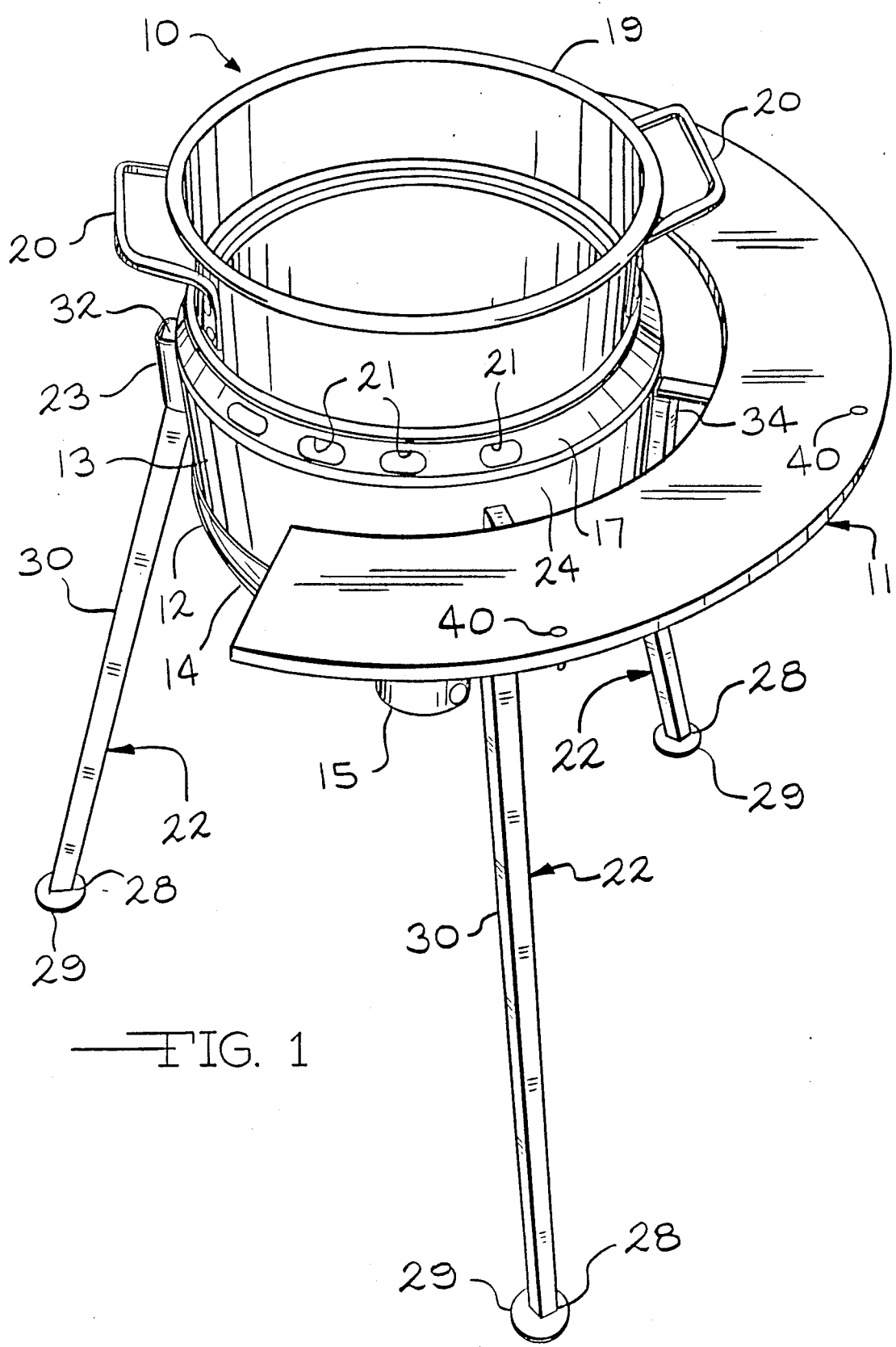
FIG. 1 is a perspective view of gas-fired portable cooking apparatus including a removable work table in accordance with the invention.
Figure 2:
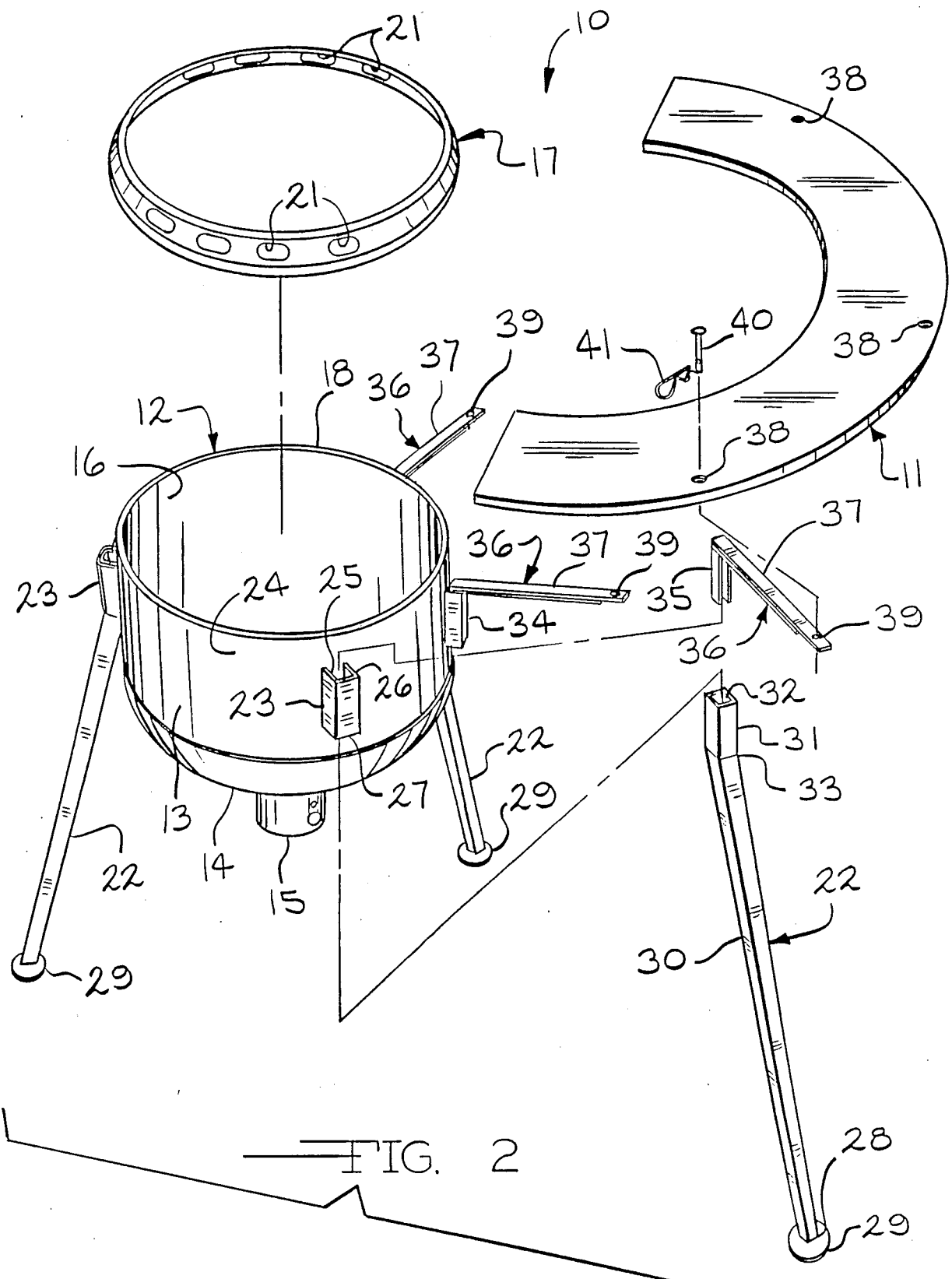
FIG. 2 is an exploded perspective view of the apparatus of FIG. 1.

Turning to FIGS. 1 and 2 of the drawings, portable gas-fired cooking apparatus 10 is shown incorporating a removable work table 11 according to the invention. The cooking apparatus 10 includes a housing 12 illustrated as being generally dish shaped with a tubular side 13 and a bottom 14. A conventional gas-fired burner 15 is mounted at the center of the bottom 14 to produce heat in an interior 16 of the housing 12. The burner 15 may be connected to a standard portable propane gas tank (not shown) as is well known in the art. A rim 17 fits onto an upper housing edge 18 for supporting above the burner 15 a cooking vessel 19, which is illustrated as a pot having handles 20. The rim 17 is provided with a plurality of spaced openings 21 for venting combustion gases from the housing interior 16.

The housing 12 is supported on three legs 22. The legs 22 are removably attached to three tubular brackets 23 welded to an outer surface 24 of the housing side 13. The brackets 23 are shown as being generally U-shaped to cooperate with the surface 24 for defining a generally vertical opening 25 having an upper end 26 and a lower end 27. The bracket openings 25 are illustrated as having square cross sections. However, the openings 25 may have a different configuration, such as a round or a triangular cross section. Each leg 22 has a lower end 28 terminating at a foot 29, a central portion 30 and an upper end 31 which defines a central opening 32. The upper leg ends 31 are of a shape and size to telescope into the housing bracket openings 25 for removably attaching the legs 22 to the housing 12. Each upper leg end 31 is shown formed at an angle or bend 33 relative to the central leg portion 30 both to limit only the upper end 31 to entry into the bracket openings 25 and to increase the base of support for the apparatus 10. Other means for limiting only the leg end 31 to entry into the brackets may be used, such as a step or dimensional increase (not shown) in place of the bend 33 or a projection (not shown) attached to the legs 22 in place of the bend 33 or a pin (not shown) passing through aligned holes in the brackets 23 and the upper leg ends 31.

The work table 11 is supported by at least two of the tubular brackets 23, and preferably also by a tubular bracket 34 located between such two brackets 23. At each bracket 23 which supports the work table 11, a leg 35 on an L-shaped support bracket 36 is telescopically inserted into the leg opening 32 at the upper end 26 of the bracket opening 25. The brakcet 34 also is shaped to receive directly a bracket leg 35. If the housing side is sufficiently large to attach a longer bracket 23, the leg end 31 could telescope only into the lower end 27 of the bracket opening 25 and the support bracket leg 35 could telescope only into the upper end 26 of the bracket opening 25 without entering a leg opening 32. However, by telescoping the support bracket leg 35 into the leg opening 32, the brackets 23 only need be long enough to provide a rigid attachment for the legs 22.

The work table 11, which is shown as being arcuate shaped, is positioned to rest on horizontal sides 37 of the brackets 36 after the brackets 36 are attached to the housing 12. The work table 11 includes openings 38 which align with bracket openings 39 when the work table 11 is positioned on the brackets 36. Pins 40 may be inserted through the aligned openings 38 and 39 and held in place by clips 41 to prevent the work table from falling off the brackets 36. Or, the pins 40 can be formed as an integral portion of the work table 11 or other means may be used to releasably attach the work table 11 to the brackets 36. In some cases, it may not be necessary to remove the brackets 36 from the work table 11 and the brackets 36 may be permanently attached to the work table 11 or may be an integral part of the work table 11.

Although the cooking apparatus 10 shown in the drawings is of the gas-fired type, it will be apparent to those skilled in the art that the work table and the structure for attaching the work table and legs to the apparatus housing will be equally applicable to other types of cooking apparatus, such as portable charcoal grills. Various changes and modifications to the described modes for carrying out the invention will be apparent to those skilled in this art without departing from the spirit and the scope of the following claims.

I claim:

1. Portable cooking apparatus comprising a housing having an exterior surface, means on said housing for supporting a cooking vessel, means in said housing for heating a supported cooking vessel, at least three spaced tubular housing brackets attached to said exterior surface, said housing brackets each having a generally vertically directed opening extending therethrough with each bracket opening having open upper and lower ends, at least three tubular legs each having an open upper end and a lower end, said upper ends having a shape for telescoping into said lower housing bracket ends whereby said legs are removably attached to said housing, a work table, and means for removably attaching said work table to at least two of said housing brackets, said work table attaching means including at least two support brackets attached to said table, said support brackets each including an end which telescopes through a different upper housing bracket end and into an open upper end of a tubular leg within such housing bracket, whereby the supported portion of both the leg and the support bracket are coaxially located within the housing bracket.

2. Portable cooking apparatus, as set forth in claim 1, and further including a fourth tubular bracket attached to said housing at a location spaced between said at least two housing brackets, said fourth tubular bracket having a vertically directed opening with an open upper end, and a third support bracket having a first end attached to said work table between said at least two support brackets and a second end which telescopes into said fourth tubular bracket through its upper end.

3. Portable cooking apparatus, as set forth in claim 2, and further including means for releasably attaching said support brackets to said work table.

* * * * *